Patented May 29, 1923.

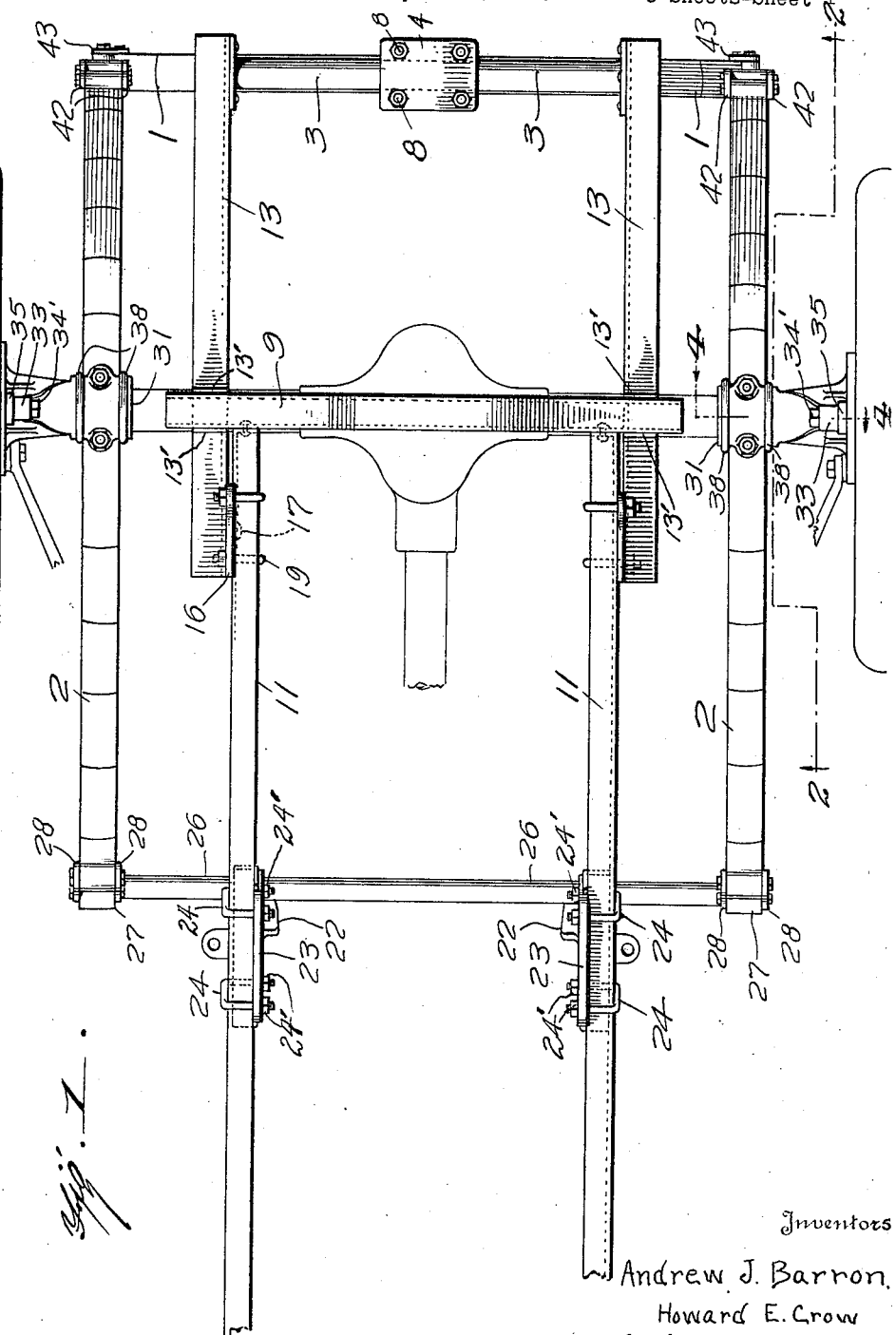

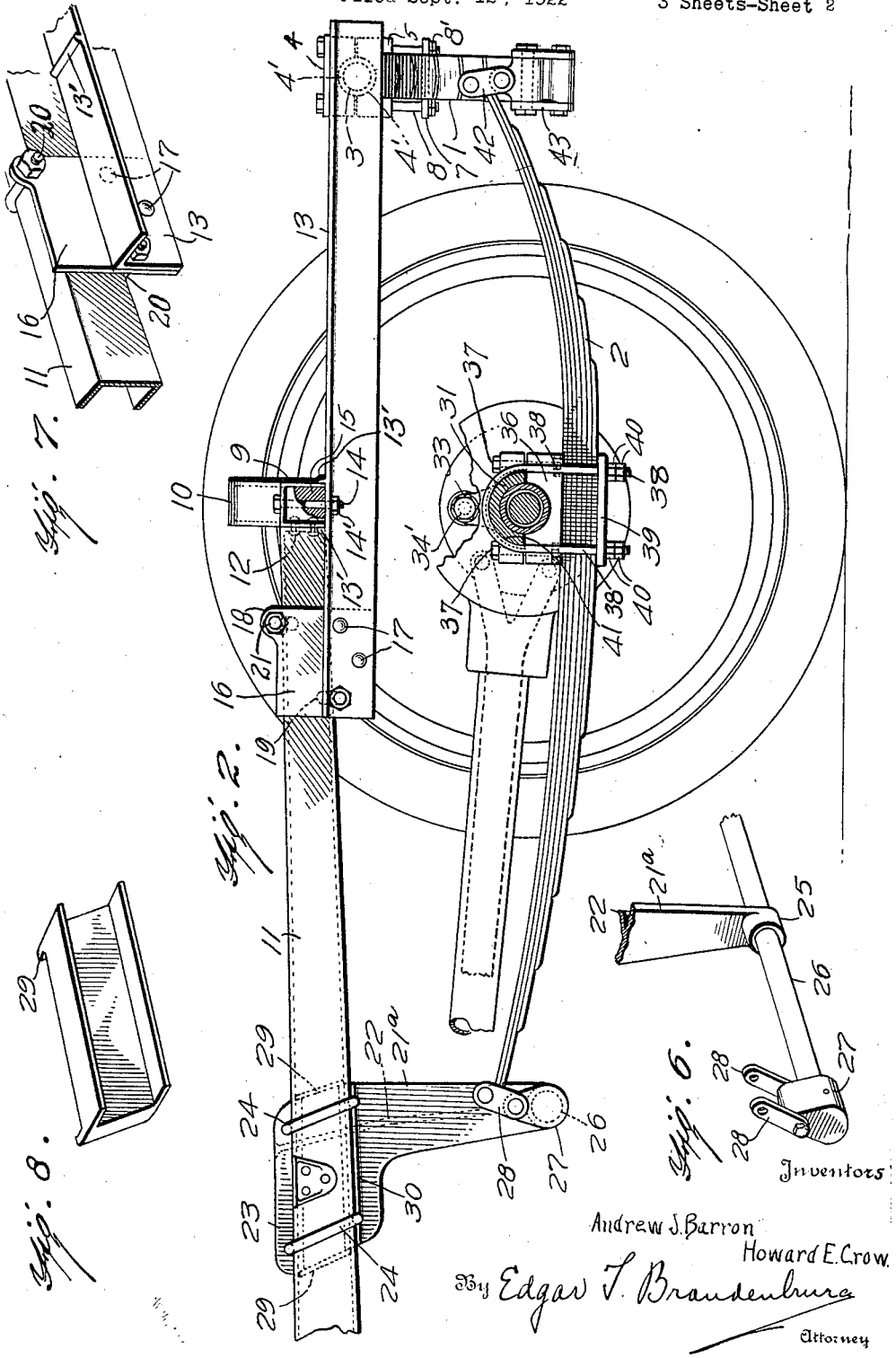

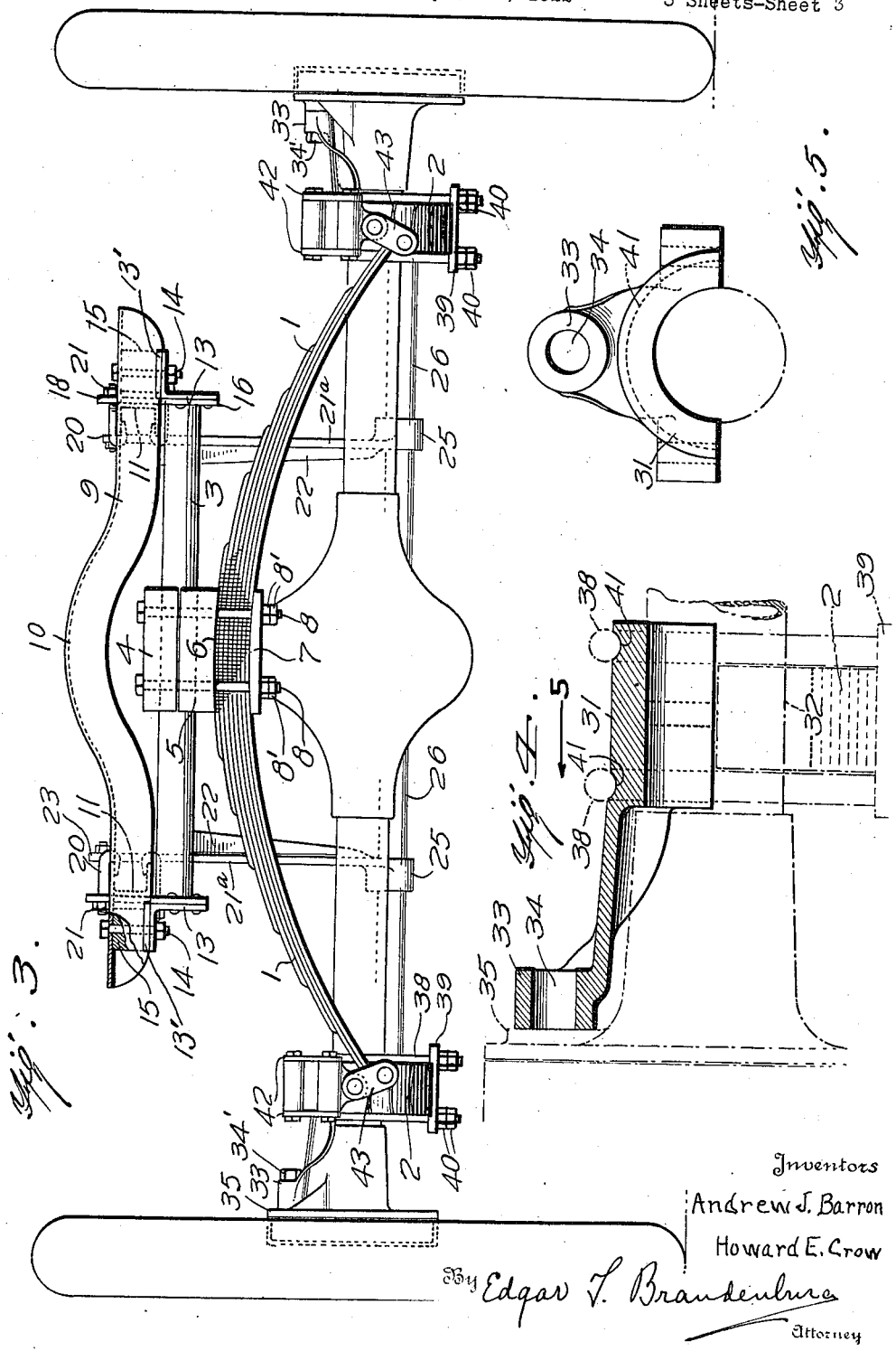

1,457,138

UNITED STATES PATENT OFFICE.

ANDREW J. BARRON AND HOWARD E. CROW, OF CINCINNATI, OHIO, ASSIGNORS TO THE CINCINNATI HORSE SHOE & IRON COMPANY, A CORPORATION OF OHIO.

PLATFORM-SPRING SUSPENSION FOR AUTOMOBILES.

Application filed September 12, 1922. Serial No. 587,732.

*To all whom it may concern:*

Be it known that we, ANDREW J. BARRON and HOWARD E. CROW, residents of Cincinnati, Ohio, citizens of the United States, have invented certain new and useful Improvements in Platform-Spring-Suspensions for Automobiles, of which the following is a specification.

Our invention has for its object to provide novel and improved platform-spring suspension attachments for the Ford touring automobile and also for the light Ford delivery car, which uses the same form of chassis; greatly improved results being obtained by the use of the platform-spring suspension attachments of our invention, as demonstrated by road tests which have been made.

With this object in view, the invention resides in the novel construction, combination, and arrangement of structural parts, as hereinafter fully described in the body of this specification, summarized in the claims, and disclosed in the drawings.

The drawings, forming part of this specification, illustrate our preferred form of embodiment of the platform-spring suspension attachments, it being understood that our invention is susceptible of structural changes and the employment of mechanical equivalents. The different figures or views shown in the drawings may be briefly described as follows:

Figure 1 is a top plan view of our platform-spring suspension adapted for Ford automobiles;

Figure 2 is a view in side elevation thereof;

Figure 3 is a view in end elevation thereof;

Figure 4 is a fragmentary detail view of the rear axle-casing, showing in section part of the device for suspending one of the side springs from the axle brake-housing;

Figure 5 is a detail view, in end elevation, of the part of the side spring suspension device shown in Fig. 4;

Fig. 6 is a fragmentary detached detail view, in perspective, of the suspension mechaism for the front ends of the side springs;

Figure 7 is a fragmentary detail view, in perspective, of two longitudinal chassis-bars and the mechanical means for securing them together; and Figure 8 is a detached, detail view, in perspective, of a reinforcing element.

Referring, now, in detail to the drawings:

1 designates the rear cross spring, and 2, 2 the side or longitudinal springs.

3 designates a supporting-bar for the cross spring, said supporting-bar being disposed above, and in the vertical plane of, said spring and extending longitudinally thereof, the length of said bar being substantially less than that of said spring.

A sectional boxing, comprising the members 4 and 5, each provided with a hemispherical recess 4', surrounds said supporting member 3, at the longitudinal central portion thereof, the member 5 having the lower curved face 6, against which the top of the cross-spring 1 seats. A plate 7, having a curved upper face, as shown, is adapted to bear against the under surface of the cross-spring, and bolts 8 passing through said boxing 4—5 and through said plate 7 are provided with nuts 8', which are tightened up to hold the parts in relative position.

At each end of the cross-spring supporting member 3 is a longitudinally-extending bar 13, which is secured, at one end thereof, to said supporting member 3.

Extending transversely of the bars 13, 13 and preferably in the same vertical plane as the rear axle is a channel-bar 9, which may be arched, as shown at 10, at its longitudinal central portion. The channel-bar 9 may be secured, toward its ends, to the bars 13, 13, by bolts 14, which pass through said channel-bar and, preferably, through blocks 15 in the channel of the bar 9, and through said bars 13, 13. Two of such blocks 15 are provided, disposed in the channel of the bar 9 at the points of attachment of the latter to said bars 13, 13. Nuts 14' are screwed on the bolts 14. Transverse lips 13' may be provided on the bars 13, 13, to bear against the depending flanges of the channel-bar 9.

Two chassis channel-bars 11, 11 bear, at one end thereof, against the front depending side-flange of the channel-bar 9 (said channel-bar 9 being disposed on top of the angle-bars 13, 13 with its side-flanges projecting downward and bearing against said angle-bars), and may be suitably secured thereto, as by rivets 12. Each of the channel-bars 11, 11 is disposed with its parallel flanges projecting horizontally.

The chassis channel-bars 11, 11 may also be suitably secured to the angle-bars 13, 13, preferably by two connecting plates 16 riveted, as shown at 17, to the depending flanges of the angle-bars 13, 13. One of said connecting plates 16 connects each of the channel-bars 11 with its adjacent angle-bar 13. Each connecting plate 16 is provided with a lateral apertured ear 18 and with a slot 19. Hook-bolts 20 pass through the slot 19 and the aperture in the ear 18 of each plate 16 and hook over the free edges of the horizontal parallel flanges of the channel-bar 11, as shown most clearly in Fig. 3. Nuts 21 are screwed on the threaded ends of the shanks of the hook-bolts 20, thus securing the chassis channel-bars 11, 11 tightly to said connecting plates 16, 16.

Depending from each of the chassis channel-bars 11, 11 is a hanger or support 21$^a$, preferably having a longitudinally-extending reinforcing rib 22. The hanger is expanded at one end to provide a head 23, provided with two pairs of openings, and with a rib 30. U-bolts 24, 24 pass around the chassis channel-bars 11, 11, and project through said openings in the head 23, and nuts 24' are tightened up on the threaded ends of said bolts to secure said hanger in position. At the point of attachment of each hanger 21$^a$ to the channel-bar 11, a "box" or plug 29' is fitted in the channel of the bar 11, so as to strengthen the structure at this point. The box or plug 29' is peculiarly formed, and as shown, preferably comprises a short length of channel-bar, having lateral, transverse flanges 29, 29 projecting oppositely from the side flanges thereof. In assembling the channel-member 29' and the bracket 21$^a$ with the channel-bar 11, the channel-member is slipped into the channel of the bar 11, with the free edges of the side flanges of the channel-member abutting the body portion or web portion of the channel-bar 11, and with the lateral flanges 29, 29 projecting beyond the free edges of the side flanges of the channel-bar 11. The head 23 of the bracket 21$^a$ is now placed against the body or web-portion of the channel-member 29', said head fitting between the flanges 29, 29 and bearing thereagainst. There is, thus, an interlocking action between the head 23 and the channel-member 29', and the latter is held against independent sliding movement longitudinally of the channel-bar 11.

Each hanger 21$^a$ carries at the end thereof opposite the head 23, a hub portion 25, through which extends a shaft 26. The shaft carries, at each end, a shackle supporting part 27, the shackles or links 28, 28, at one end thereof, being articulated with said part 27, and said shackles, at the other end thereof, being articulated with the front end of the adjacent side spring 2.

A saddle-member 31, transversely curved to conform to the curvilinear contour of the axle-housing 32 (as most clearly shown in Fig. 4), and having a lateral projection 33 provided with an opening 34 registering with the opening through the usual perch hole in the Ford automobile brake-drum housing 35, is seated on the axle-housing, at each end thereof. A bolt 34', passing through said registering apertures secures the saddle-member against creeping, either in a direction longitudinally of the axle-housing 32, or by turning around said axle-housing.

The saddle-member 31 extends half way around the axle-housing 32, and a complemental saddle-member 36 is disposed beneath the saddle-member 31 and also passes half way around the axle-housing. The two saddle-members 31 and 36, thus being in contact with each other, bolts 37 are passed through alined openings therein to secure the saddle-members together.

Each of the side-springs 2 passes beneath the corresponding or adjacent saddle-member 36, and U-bolts 38 pass over the saddle-member 31 and extend down on each side of the spring 2 and pass through a plate 39, nuts 40 being tightened up on the threaded ends of said U-bolts. Preferably, each of the saddle-portions 31 is circumferentially grooved, as shown at 41, forming a seat for the U-bolts 38, and tending to prevent slipping of the U-bolts on said saddle-portions.

By the construction which has thus been described, it will be noted that there is provided an underslung seat for the side spring 2, at the longitudinal central portion thereof.

The rear end of each side spring 2 is shackled, as shown at 42, to the shackles 43 of the cross-spring 1.

Having thus fully described our invention, what we claim as new and desire to secure by Letters-Patent is:

1. In an automotive vehicle having a rear axle-housing provided with a flanged end having an opening, a saddle on said axle-housing, and having a portion thereof bearing against said flanged end, said portion provided with an opening registering with said flanged-end opening, saddle-securing means passing through said registering openings, a side spring underslung relative to said axle-housing, and means for supporting said side spring from said saddle.

2. In an automotive vehicle having a rear axle-housing provided with a flanged end having an opening, a saddle on said axle-housing and having a lateral projection bearing against said flanged end, said projection having an opening registering with said flanged-end opening, saddle-securing means passing through said registering openings, a side spring underslung relative to said axle-housing, and means for supporting said side spring from said saddle.

3. In an automotive vehicle having a rear axle-housing, the combination of a side spring underslung relative to said axle-housing, a chassis channel-bar, a reinforcing element disposed within the channel of said channel-bar and having lateral, transverse flanges projecting beyond the free edges of the side flanges of said channel-bar, a hanger depending from said channel-bar and bearing against said reinforcing member and fitting between the lateral flanges thereof, means for securing said hanger to said channel-bar, and connections between the lower end of said hanger and the front end of said spring.

4. In an automotive vehicle having a rear axle-housing, the combination of a side spring underslung relative to said axle-housing, a chassis channel-bar, a reinforcing channel-bar element disposed within the channel of said channel-bar, and having lateral, transverse flanges projecting beyond the free edges of the side flanges of said channel-bar, a hanger depending from said channel-bar and bearing against said reinforcing channel-bar element and fitting between the lateral flanges thereof, means for securing said hanger to said channel-bar, and connections between the lower end of said hanger and the front end of said spring.

5. In an automotive vehicle, having a rear axle-housing, the combination of two side springs underslung relative to said axle-housing, two chassis-bars extending longitudinally of said automobile, hangers depending from said chassis-bars, connections between the lower ends of said hangers and the front ends of said side springs, a cross-spring articulated at its ends with the rear ends of said side springs, a rearwardly-extending bar secured to each of said chassis-bars, and a rear, transversely-extending bar secured to said rearwardly-extending bars and supporting said cross-spring.

6. In an automotive vehicle, having a rear axle-housing, the combination of two side springs underslung relative to said axle-housing, two chassis-bars extending longitudinally of said automotive vehicle, hangers depending from said chassis-bars, a shaft supported by said hangers, means for articulating the front ends of said side springs with the ends of said shaft, two rearwardly-projecting bars, plates secured to said rearwardly-projecting bars, hook-bolts projecting through said plates and engaging said chassis-bars, a cross-spring articulated with the rear ends of the side springs, and a rear, transversely-extending bar secured to said rearwardly-extending bars and supporting said cross spring.

In testimony whereof we hereunto affix our signatures.

ANDREW J. BARRON.
HOWARD E. CROW.